United States Patent
Choi et al.

(10) Patent No.: US 12,342,981 B2
(45) Date of Patent: Jul. 1, 2025

(54) MOBILE ROBOT AND CONTROL METHOD THEREOF

(71) Applicant: LG ELECTRONICS INC., Seoul (KR)

(72) Inventors: Wonjun Choi, Seoul (KR); Yongjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 782 days.

(21) Appl. No.: 17/623,990

(22) PCT Filed: Jul. 3, 2020

(86) PCT No.: PCT/KR2020/008703
§ 371 (c)(1),
(2) Date: Dec. 30, 2021

(87) PCT Pub. No.: WO2021/002718
PCT Pub. Date: Jan. 7, 2021

(65) Prior Publication Data
US 2022/0346614 A1    Nov. 3, 2022

(30) Foreign Application Priority Data
Jul. 4, 2019   (KR) .................. 10-2019-0080605

(51) Int. Cl.
*A47L 9/28*  (2006.01)
*A47L 11/40*  (2006.01)
*G05D 1/00*  (2024.01)

(52) U.S. Cl.
CPC ........... *A47L 9/2805* (2013.01); *A47L 9/2836* (2013.01); *A47L 9/2894* (2013.01); *A47L 11/4011* (2013.01); *G05D 1/0221* (2013.01); *A47L 2201/06* (2013.01)

(58) Field of Classification Search
None
See application file for complete search history.

(56) References Cited

U.S. PATENT DOCUMENTS

2005/0166354 A1    8/2005  Uehigashi

FOREIGN PATENT DOCUMENTS

| JP | 2006136374 A | * | 6/2006 | ............... A47L 9/28 |
|---|---|---|---|---|
| KR | 10-2012-0114670 | | 10/2012 | |
| KR | 10-2017-0048815 | | 5/2017 | |
| KR | 10-2018-0080404 | | 7/2018 | |

(Continued)

OTHER PUBLICATIONS

KR20170048815 English translation, accessed on Oct. 2024. (Year: 2017).*

(Continued)

*Primary Examiner* — Eric W Golightly
*Assistant Examiner* — Arlyn I Rivera-Cordero
(74) *Attorney, Agent, or Firm* — KED & ASSOCIATES, LLP

(57) ABSTRACT

The present disclosure discloses a mobile robot and a control method thereof. More particularly, when a movement is detected in an area to be cleaned, a mobile robot learns whether the detected movement is a behavior pattern of causing a foreign material or not. The mobile robot performs a suitable cleaning when the movement of causing the foreign material is found or detected later.

14 Claims, 8 Drawing Sheets

(56) References Cited

FOREIGN PATENT DOCUMENTS

KR   10-2019-0033973   4/2019
KR   10-2019-0042948   4/2019

OTHER PUBLICATIONS

KR20180080404 English translation, accessed on Oct. 2024. (Year: 2018).*
JP-2006136374 English translation, accessed on Oct. 2024. (Year: 2006).*
International Search Report dated Dec. 23, 2020 issued in Application No. PCT/KR2020/008703.

* cited by examiner

[FIG. 1]
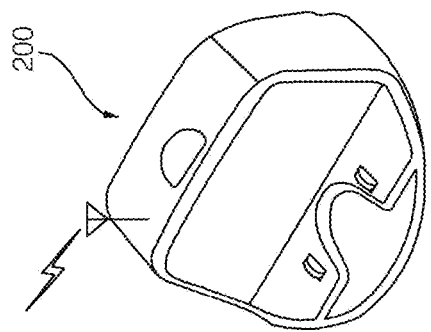
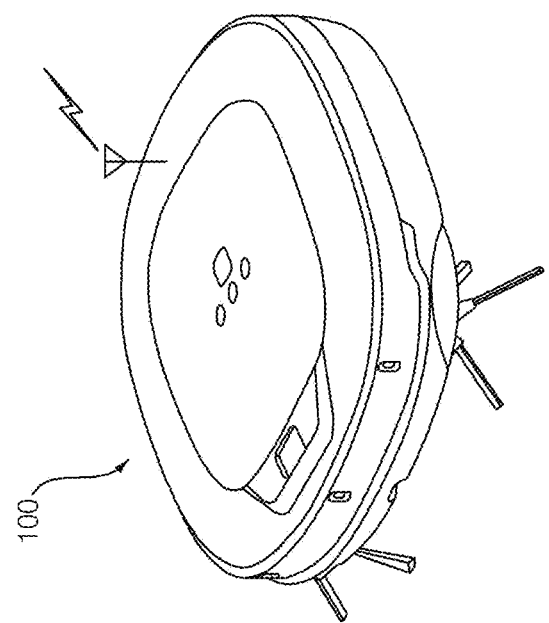

[Fig. 2]
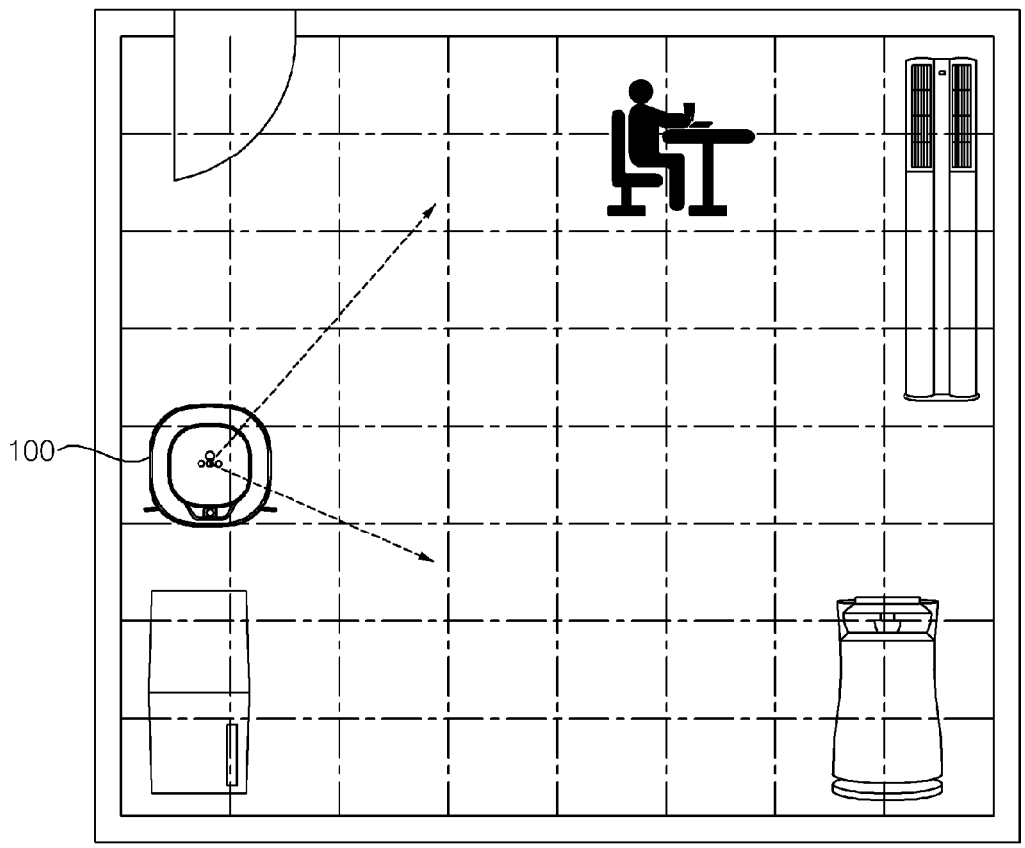
[Fig. 3]
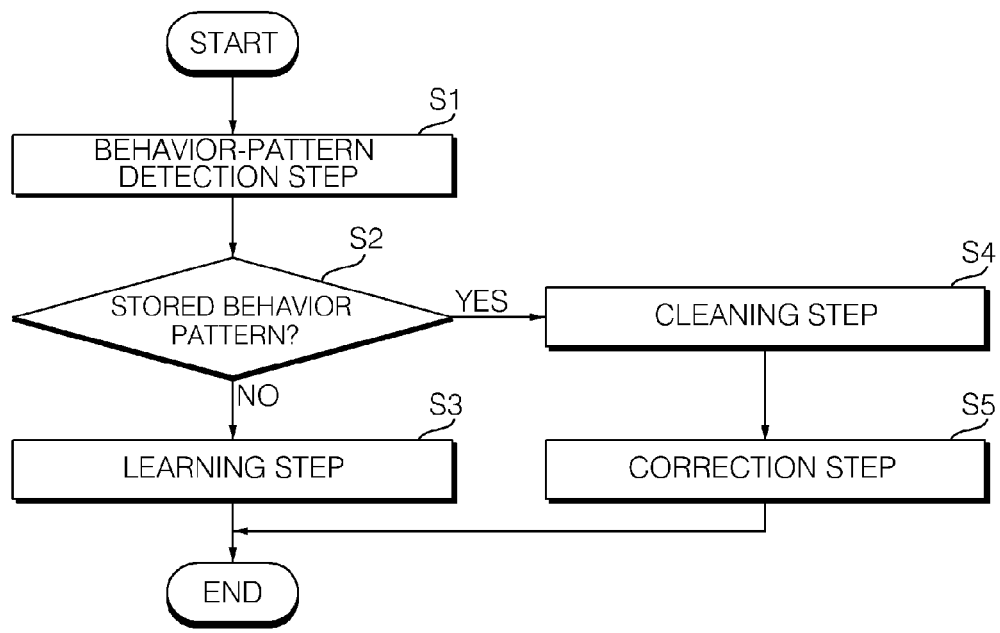

[Fig. 4]
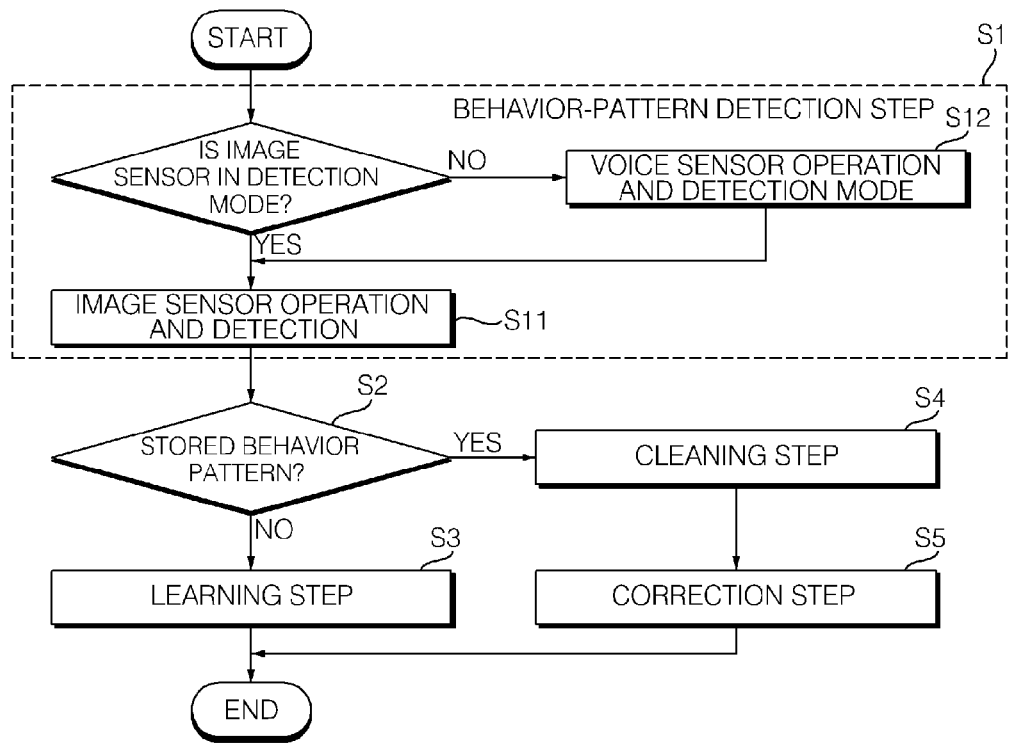

[Fig. 5]
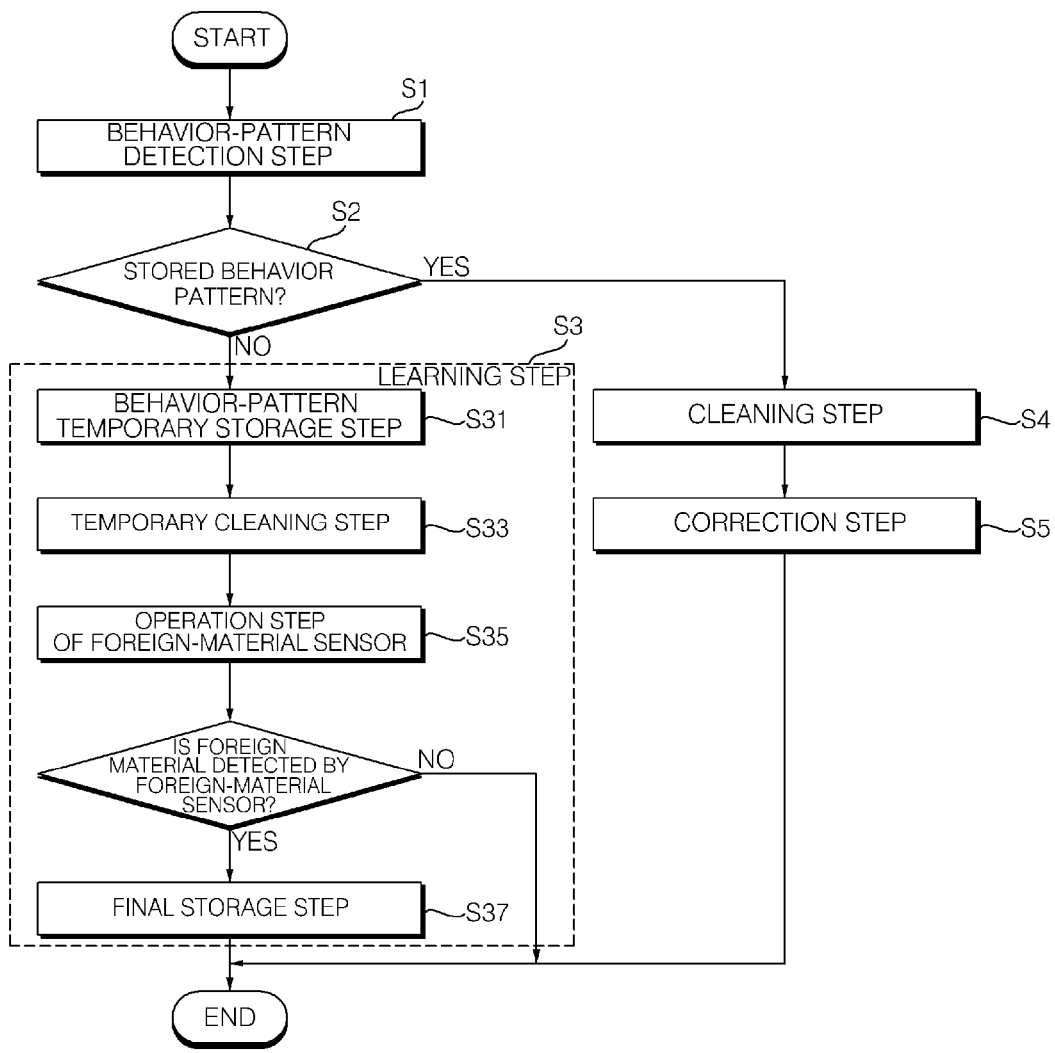

[FIG. 6]
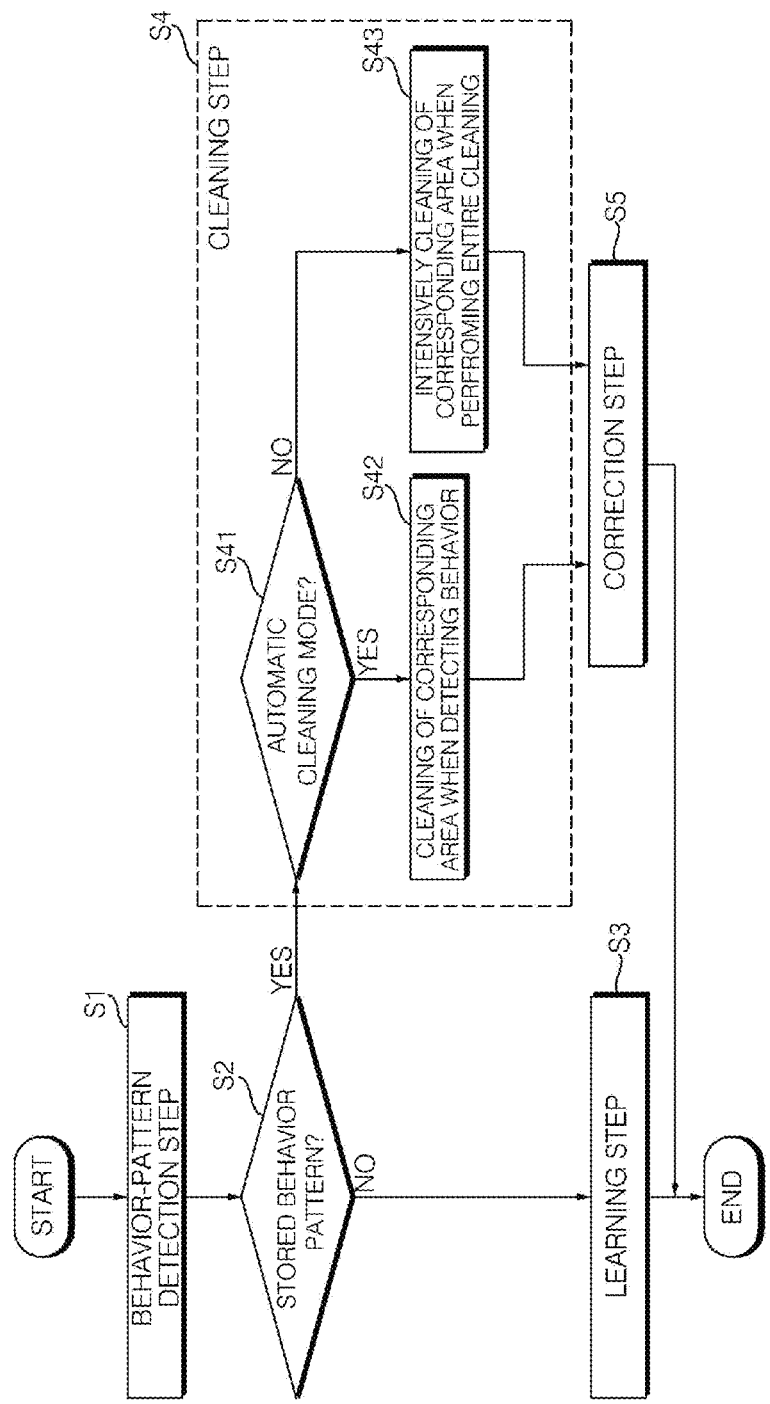

[Fig. 7]
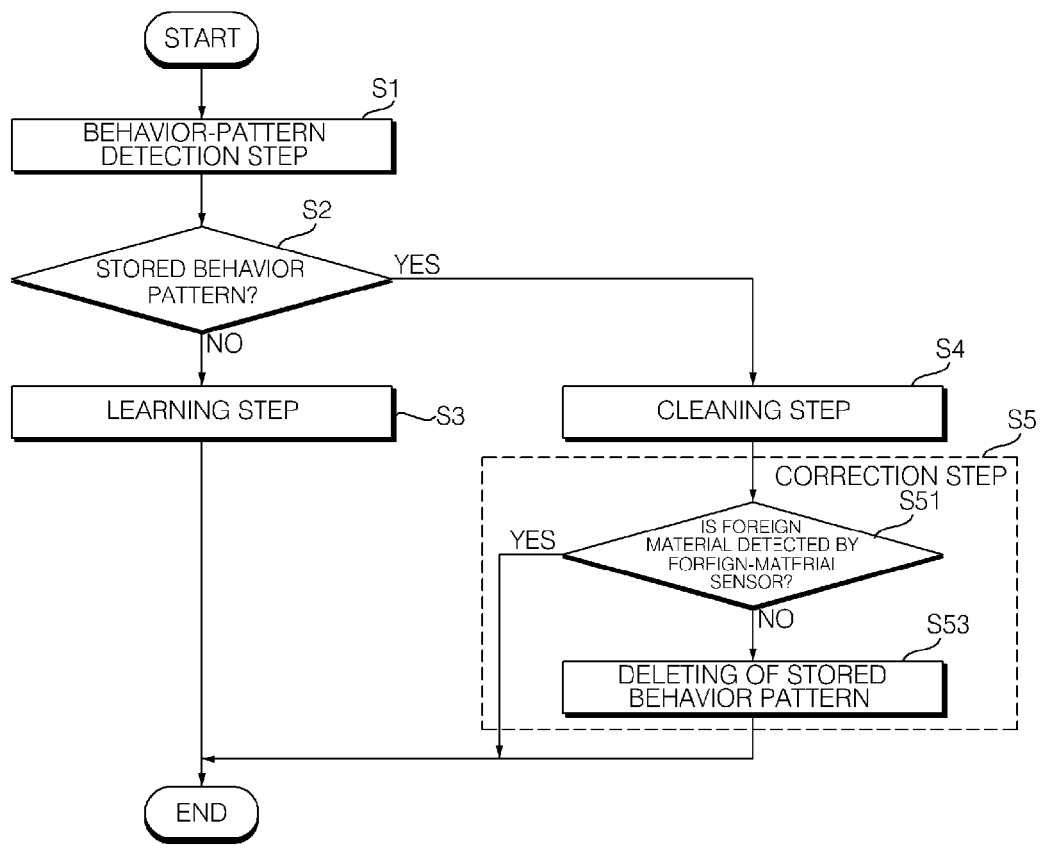

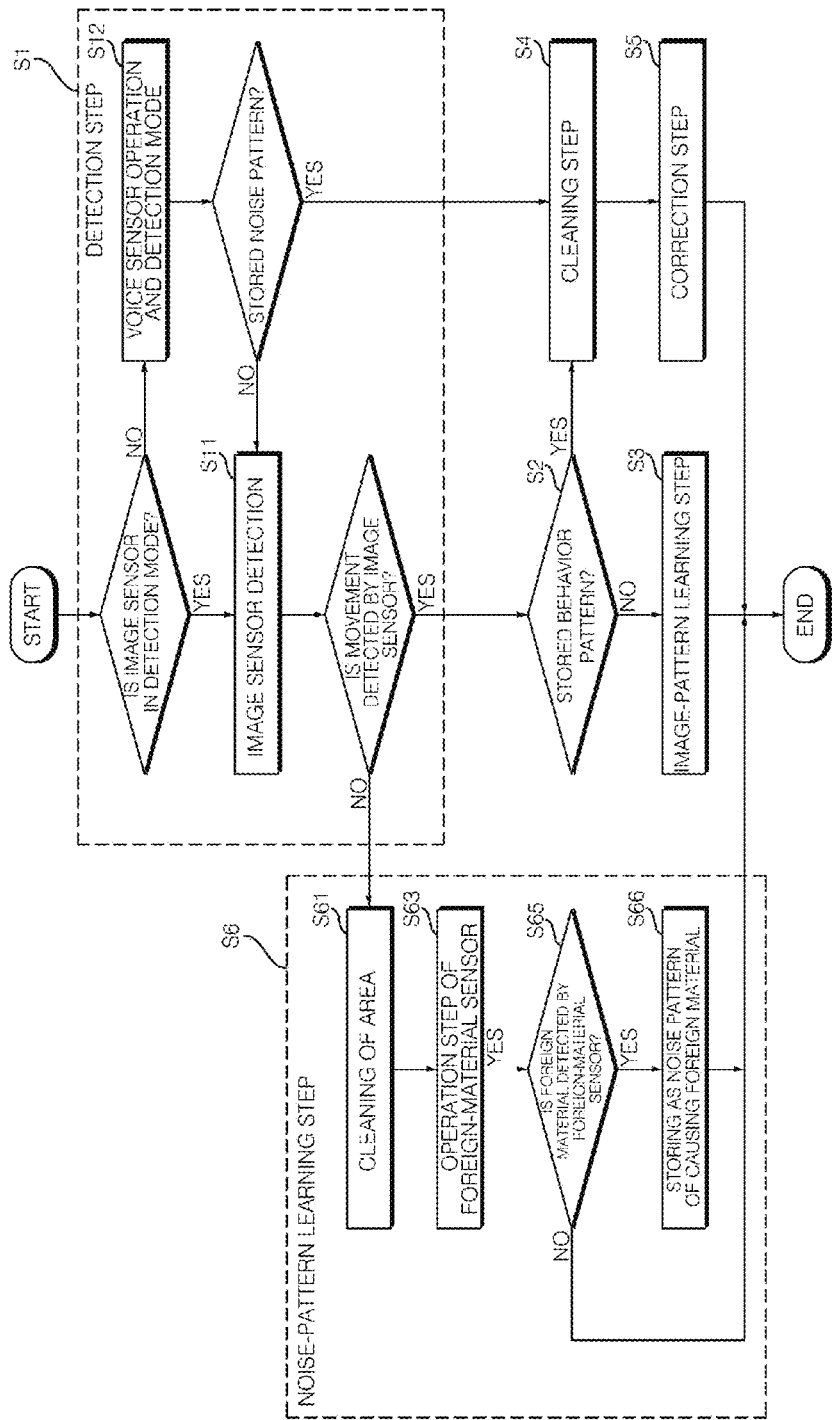

[Fig. 9]
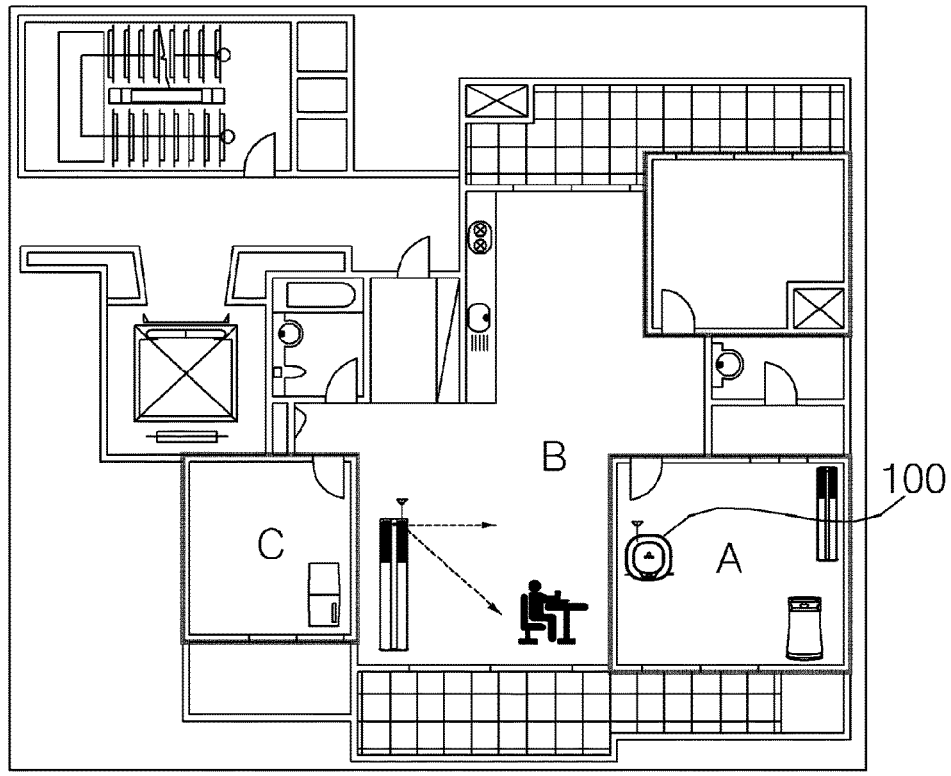
[Fig. 10]
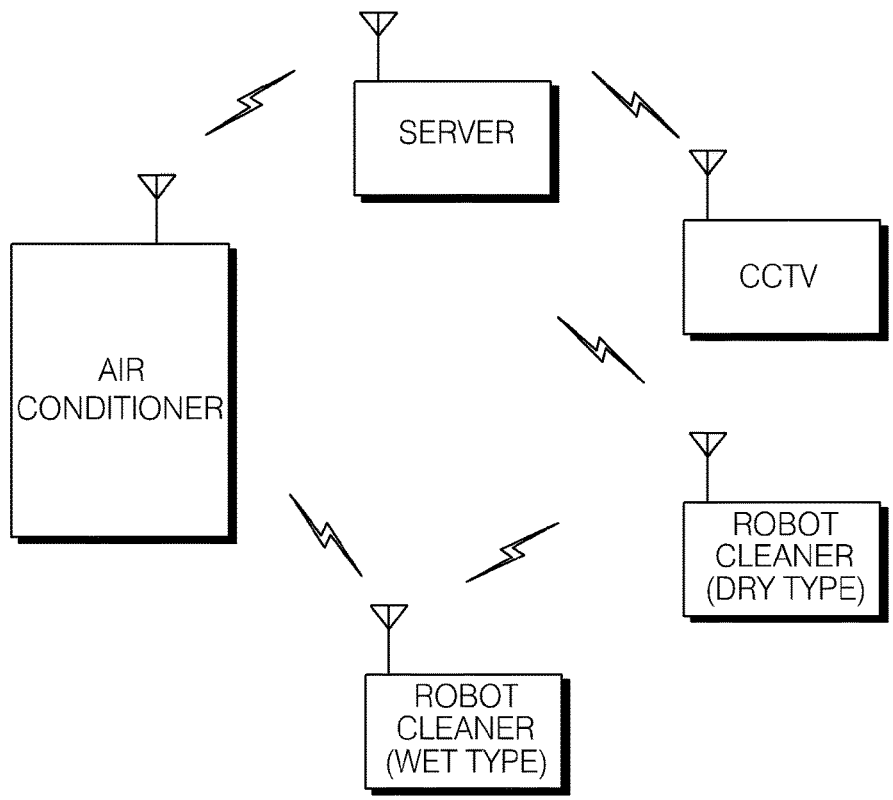

MOBILE ROBOT AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2020/008703, filed Jul. 3, 2020, which claims priority to Korean Patent Application No. 10-2019-0080605, filed Jul. 4, 2019, whose entire disclosures are hereby incorporated by reference.

TECHNICAL FIELD

The present disclosure relates to a mobile robot and a control method thereof, and more particularly, to a mobile robot that recognizes and learns a movement existing in an area and provides a customized service when the movement is shown later and a control method thereof.

BACKGROUND ART

Robots have been developed for industrial use and have been in charge of part of factory automation. In recent years, an application field of a robot has been further expanded, a medical robot, an aerospace robot, or so on has been developed, and a home robot that is used at general home is also being made. Among these robots, a mobile robot capable of driving or traveling by itself is called a mobile robot.

A typical example of a mobile robot used at home is a robot cleaner, which is a device that cleans an area by an inhaling dust or a foreign material while driving or traveling a certain area by itself.

The mobile robot is free to move since the mobile robot moves on its own, and drive or travel while avoiding an obstacle by including a plurality of sensors for avoiding the obstacle and the like during the traveling or the driving.

On the other hand, in recent years, with a development of various communication technologies, a plurality of home appliances and internet of things (IoT) devices are being networked through a wired/wireless communication.

Home appliances and Internet of Things (IoT) devices constituting a network can transmit data from one device to another device, and information of one device can be checked at another device.

Accordingly, various methods are being studied to increase user convenience by an associated or interlocked control of a mobile robot through communicating with home appliances and internet of things (IoT) devices constituting a network.

In addition, in order to improve user convenience, voice recognition (speech recognition) technology is applied to various devices, and research on a control method of a mobile robot using voice recognition technology is increasing.

For example, in Korean Patent Laid-open Publication No. 10-2012-0114670, a robot cleaner is equipped with a voice recognition unit and recognizes a voice signal of a user and executes a control command according to the recognized voice signal.

However, in Korean Patent Laid-open Publication No. 10-2012-0114670, the robot cleaner is controlled only by recognizing the voice of the user, and the robot cleaner does not provide a service according to a behavior pattern of the user without an instruction of the user.

DISCLOSURE OF INVENTION

Technical Problem

The present disclosure is for providing a mobile robot and a control method thereof being able to keep a clean state by learning a behavior pattern of causing a foreign material in an area and cleaning an area where the behavior pattern has occurred in real time when the behavior pattern is shown.

The present disclosure is for providing a mobile robot and a control method thereof being able to efficiently clean by a selective and intensive cleaning through intensively cleaning an area where the behavior pattern has occurred while cleaning of an entire area.

The technical problems of the present disclosure are not limited to the problems that are mentioned above, and other problems that are not mentioned will be clearly understood by those skilled in the art from the following description.

Solution to Problem

In order to solve the above technical problems, a mobile robot and a control method thereof according to an embodiment of this disclosure includes a detection step of detecting a movement occurring in an area to be cleaned, a determination step of determining whether the detected movement is a stored behavior pattern or not, and a first learning step of learning whether the detected movement is a behavior pattern of causing a foreign material or not when it is determined that the detected movement is not the stored behavior pattern.

The first learning step may include a temporary storage step of temporarily storing the detected movement, a temporary cleaning step of cleaning a corresponding area where the movement that is temporarily stored occurs, an operation step of a foreign-material sensor in the temporary cleaning step, and a storage step of storing the movement that is temporarily stored as a behavior pattern of causing a foreign material when a predetermined foreign material is detected by the foreign-material sensor.

The control method may include a step of detecting a noise and a learning whether the detected noise is a noise pattern of causing a foreign material or not.

When there is a movement, the mobile robot may detect the movement and clean a corresponding area where a stored behavior pattern occurs when the detected movement is the stored behavior pattern. In this instance, the mobile robot may immediately clean only the corresponding area or may clean the corresponding area while cleaning an entire area later.

The stored behavior pattern may be deleted when a foreign material is not detected later in the corresponding area where the stored behavior pattern has occurred.

The leaning data may be transmitted to a server. The mobile robot can efficiently learn or clean in association with or interlocking with other devices.

Details of other embodiments are included in the detailed descriptions and drawings.

Advantageous Effects of Invention

According to an embodiment of this disclosure, a mobile robot learns a behavior pattern of causing a foreign material and, when a stored behavior pattern is shown, detects the behavior pattern and cleans a corresponding area where the behavior pattern has occurred in real time, thereby keeping a clean state.

According to an embodiment of this disclosure, in a case that a mobile robot detects a stored behavior pattern, the mobile robot intensively cleans a corresponding area where the behavior pattern has occurred while the mobile robot cleans an entire area, thereby efficiently cleaning.

According to an embodiment of this disclosure, a mobile robot includes an audio sensor as well as an image sensor, and thus, when there is a noise, the mobile robot can learn whether the noise is a noise pattern of causing a foreign material or not and cleans when the noise is the noise pattern of causing the foreign material.

The effects of the present disclosure are not limited to the above effects, and other effects that are not mentioned will be clearly understood by those skilled in the art from claims.

BRIEF DESCRIPTION OF DRAWINGS

FIG. 1 is a perspective view of a mobile robot according to an embodiment of this disclosure.

FIG. 2 is a state diagram schematically showing a method of detecting a movement.

FIG. 3 is a block diagram showing an overview of a control method of a mobile robot.

FIG. 4 is a block diagram showing a behavior-pattern detection step.

FIG. 5 is a block diagram showing a learning step.

FIG. 6 is a block diagram showing a cleaning step.

FIG. 7 is a block diagram showing a correction step.

FIG. 8 is a block diagram showing a noise-pattern learning step.

FIG. 9 is a state diagram schematically showing a method for detecting a movement in association with or interlocking with another device.

FIG. 10 schematically shows a method of interworking a robot cleaner with other devices through a server.

MODE FOR THE INVENTION

The present disclosure will be clarified with reference to embodiments described below in detail together with the accompanying drawings. However, the present disclosure is not limited to the embodiments disclosed below, but may be implemented in various different forms. These embodiments are just provided to make the present disclosure complete, and to fully disclose the present disclosure to a person having ordinary skill in the art to which the present disclosure pertains. A scope of the present disclosure is only defined by claims. The same reference numerals refer to the same components, units, members, portions, or elements throughout the specification.

Hereinafter, the present disclosure will be described with reference to drawings for explaining a mobile robot and a control method thereof according to an embodiment of the present disclosure.

A mobile robot 100 will be described with reference to FIG. 1.

The mobile robot 100 may drive or travel a predetermined area or a certain area by itself. The mobile robot may perform a function of cleaning a floor. The cleaning of the floor may include inhaling a foreign material or mopping the floor. Hereinafter, a robot cleaner will be described as an example of the mobile robot.

The mobile robot 100 may include a battery and thus may include a power supply unit that supplies power to the mobile robot. The power supply unit may supply power to each component of the mobile robot, and may be charged by receiving power from a charging base (a charging stand) when a remaining amount is insufficient.

The mobile robot 100 may further include a battery detector (not shown) that detects a charge status of the battery and transmits a detection result to a processor. The battery may be connected to the battery detector, and a battery level and a charge status of the battery may be transmitted to the processor. The remaining amount of the battery may be displayed on a display of an output unit.

A charging base 200 is a device for charging the battery when the battery of the cleaning robot is discharged. When the battery installed inside the mobile robot is discharged, the mobile robot may return to the charging base and the battery may be charged.

The mobile robot 100 may include a casing forming an exterior. The mobile robot may include a suction unit and a dust container, and thus, may perform cleaning by suctioning a foreign material and storing the foreign material in the dust container. The mobile robot may include a mop, and thus, may perform cleaning by wiping or mopping a foreign material. The mobile robot may include a brush and a dust container, and thus, may perform cleaning by sweeping a foreign material and storing the foreign material in the dust container.

The mobile robot 100 may include a driving unit or a traveling unit that moves a main body. The mobile robot may include a sensor 110 that senses or detects a surrounding environment. The mobile robot may include a processor 150 to process data sensed by the sensor and control driving and an operation of the mobile robot. The processor may be placed inside the mobile robot.

The driving unit may include a wheel for driving the mobile robot. The mobile robot may move or rotate through a wheel rotation. The mobile robot may include at least one wheel. Each wheel may rotate simultaneously or separately so that the mobile robot may freely drive or travel. The wheel may include a main wheel and a subwheel.

The main wheel may include main wheels provided, respectively, on both sides at a lower portion of the mobile robot. The processor may make the mobile robot drive or travel by rotating the main wheels simultaneously or separately. Each main wheel may be driven by a different motor.

The sub-wheel may support the mobile robot together with the main wheel, and assists driving or traveling of the mobile robot by the main wheel.

The suction unit may be disposed at a front side of the main body. The suction unit may suck air containing dust. The suction unit may be detachably coupled to the mobile robot. If the suction unit is separated from the main body, a mop unit may be detachably coupled to the main body by replacing the separated suction unit with the mop unit.

A sensing sensor 110 may be disposed on the mobile robot 100 or may be disposed on the charging base 200. The sensor may be disposed at a front side of the main body, or may be disposed at a rear side or other portions of the main body. The sensor may include an image sensor 111 and a voice sensor (a speech sensor) 113.

The image sensor 111 may detect an obstacle or a terrain feature at a periphery of the mobile robot. The image sensor 111 may transmits detected data to the processor 150. The image sensor 111 may include a camera module. The camera module may include a digital camera. The digital camera may include at least one optical lens, an image sensor (for example, a CMOS image sensor), and a digital signal processor (DSP). The image sensor may include a plurality of photodiodes (e.g., pixels) where an image is focused by light passing through the at least one optical lens. The digital signal processor may generate an image based on a signal output from the photodiodes. The digital signal processor may generate not only still images but also moving images formed of frames including still images.

In order to improve photographing efficiency, a plurality of cameras may be installed for each part. An image photographed by the camera may be used to recognize a type of a material, such as a dust, a hair, a floor, or so on existing in a corresponding space, whether cleaning has been performed or not, or when cleaning has been performed.

The camera may photograph a state of a cleaning area or an obstacle existing at a periphery of the mobile robot. The photographed image may be stored in a storage unit, and transmitted to a processor to be processed.

The mobile robot may increase accuracy of spatial recognition, position recognition, and obstacle recognition by using a plurality of images. Alternatively, the mobile robot may increase accuracy of spatial recognition, position recognition, and obstacle recognition by using effective data through selecting one or more images from a plurality of images.

The detection sensor 110 may include an obstacle detection sensor that detects an obstacle at a front side. In addition, the detection sensor may further include a cliff detection sensor for detecting existence or absence of a cliff on a floor in a driving area, and a lower camera sensor for acquiring an image of a floor.

The obstacle detection sensor may include an infrared sensor, an ultrasonic sensor, a radiofrequency (RF) sensor, a geomagnetic sensor, a position sensitive device (PSD) sensor, or the like. Meanwhile, a position and a type of a sensor included in the obstacle detection sensor may vary depending on a type of a mobile robot, and the obstacle detection sensor may include any of more various sensors.

The detection sensor may include a foreign-material detection sensor. The foreign-material detection sensor may make the cleaning robot recognize and clean a foreign material such as a dust. The foreign-material detection sensor may include an infrared sensor, an ultrasonic sensor, a radiofrequency sensor, a geomagnetic sensor, a position sensitive device sensor, or the like.

Meanwhile, the detection sensor 110 may further include a movement detection sensor that detects a movement of the mobile robot and outputs movement information. For example, as a movement detection sensor, a gyro sensor, a wheel sensor, an acceleration sensor, or the like may be used.

The gyro sensor detects a rotation direction and analyzes out a rotation angle when the mobile robot moves according to a driving mode. The gyro sensor detects or analyzes out an angular velocity of the mobile robot and outputs a voltage value proportional to the angular velocity. The processor calculates a rotation direction and a rotation angle using the voltage value output from the gyro sensor.

The wheel sensor is connected to the wheel unit to detect number of revolutions of a wheel. In this instance, the wheel sensor may be a rotary encoder.

The acceleration sensor detects a change in a speed of the mobile robot, for example, a change in a speed of the mobile robot at the time of starting, stopping, turning, collision with an object, or so on.

In addition, the acceleration sensor may be built into the processor to detect a change in a speed of the mobile robot.

The processor 150 may calculate a position change of the mobile robot 100 based on movement information output from the movement detection sensor. The position may be a relative position corresponding to an absolute position using image information. Performance of position recognition using image information and obstacle information in the mobile robot can be improved through the relative position recognition.

The mobile robot may include a voice sensor 113. The voice sensor may detect and store noise or voice, and may transmit data to the processor to be processed. According to an embodiment, the mobile robot 100 may include a voice recognition module (a speech recognition module) that performs voice recognition or speech recognition inside or outside the processor 150. According to an embodiment, a simple voice recognition may be performed by the mobile robot 100 itself, and high-dimensional voice recognition such as processing of natural language may be performed by a server.

In addition, the mobile robot may include an input unit where on/off or various commands are input. The input unit may include a button, a dial, a touch screen, or so on. The input unit may include a microphone for receiving a voice instruction of a user. Various control commands necessary for an overall operation of the mobile robot may be received through the input unit.

In addition, the mobile robot may include an output unit. Thus, reservation information, a battery status, an operation mode, an operation status, an error status, or so on may be displayed as an image or output sound.

The output unit may include an audio output unit that outputs an audio signal. The sound output unit may output a warning sound, or a warning or a notification message for informing an operation mode, an operation state, an error state, or so on as sound under a control of the processor. The audio output unit may convert an electrical signal from the processor to an audio signal and output the audio signal. To achieve this, a speaker or the like may be provided.

In addition, the mobile robot may include a display that displays reservation information, a battery status, an operation mode, an operation status, an error status, or so on as an image.

The mobile robot may include a processor 150 for processing and determining various information such as recognizing a current location, and a storage unit 170 for storing various data. In addition, the mobile robot may further include a communication unit that transmits and receives data to and from an external terminal.

The processor 150 may control an overall operation of the mobile robot 100 by controlling an image sensor, an input unit, a driving unit, and a suction unit constituting the mobile robot 100. The processor 150 may process a voice input signal of a user, which is received through a voice sensor 113, and may perform a voice recognition process.

The storage unit 170 may record various information necessary for a control of the mobile robot 100, and may include a volatile or nonvolatile recording medium. In the recording medium, data that can be read by a microprocessor may be stored. The recording medium may include a hard disk drive (HDD), a solid state disk (SSD), a silicon disk drive (SDD), a read only memory (ROM), a random access memory (RAM), a compact disc read only memory (CD-ROM), a magnetic tape, a floppy disk, an optical data storage device, or the like.

In addition, a map for a driving area may be stored in the storage unit 170. The map may be input by a server, an external terminal, or the like capable of exchanging information with the mobile robot 100 through wired or wireless communication, or may be generated by a learning of the mobile robot 100 by itself.

A location of rooms in a driving area may be displayed on a map. In addition, a current position of the mobile robot 100 may be displayed on the map, and a current position of the mobile robot 100 on the map may be updated in a driving or traveling process. A map, which is the same as the map stored in the storage unit 170, may be stored in an external terminal.

The storage unit 170 may store cleaning-history information. The cleaning-history information may be generated each time cleaning is performed.

Referring to FIG. 2 and FIG. 3, a control method of a mobile robot for learning a behavior pattern will be described. An object in which a behavior pattern is learned may include all moving things including a person and an animal. Hereinafter, 'movement' or 'noise' is data before being processed by a processor, and 'behavior pattern' or 'noise pattern' is data processed by the processor.

For example, as shown in FIG. 2, when a special movement of a user is found or shown in a 12 o'clock position of a room, a mobile robot 100 disposed at a 9 o'clock position may detect the movement. That is, a processor 150 disposed in the mobile robot located at the 9 o'clock position may detect the movement occurring at the 12 o'clock position. In this instance, when the movement is a movement of causing a foreign material, the processor 150 disposed in the mobile robot located at the 9 o'clock position may control the mobile robot 100 to clean the generated foreign material.

The processor 150 may detect a movement through a detection sensor 110 (S1), and may determine whether the detected movement is a stored behavior pattern (S2).

When the movement detected in the detection step S1 is determined as a stored behavior pattern stored in a storage unit 170 in the determination step S2, the mobile robot is controlled to clean a corresponding area where the behavior pattern has occurred (S4). When the movement detected in the detection step Si is not determined as the stored behavior pattern stored in the storage unit 170 in the determination step S2, the mobile robot learns whether the behavior pattern is a behavior pattern of causing a foreign material or not in a learning step S3.

The processor may correct or edit the stored behavior pattern in a correction step S5 after performing the cleaning step S4.

With reference to FIG. 4, the detection step S1 will be described.

A detection sensor 110 for detecting a movement may include an image sensor 111 for detecting an image, and a voice sensor 113 for detecting a noise generated due to the movement. However, the present disclosure is not limited thereto, and the detection sensor 110 may include all detection sensors capable of sensing or detecting.

The image sensor 111 is a device that detects a space and a movement. The image sensor 111 may detect a movement. The image sensor 111 may photograph a movement as an image. The image sensor 111 may divide the space in units of cells and detect the movement in a unit of a cell. For example, as shown as a single dotted line of in FIG. 2, the space may be divided in units of cells and a corresponding unit may be specified in a unit of a cell. The image sensor 111 may detect in which area (cell) a living thing is located and what movement the living thing is performed. The image sensor 111 may transmit the detected or photographed data to the processor 150.

The image sensor 111 may be turned on/off. When the image sensor is in a detection mode (on), the image sensor may detect a movement and transmit the data to the processor 150 even in a waiting state (S11). In this instance, the image sensor 111 may also detect a corresponding area where a behavior has occurred and may transmit data to the processor 150.

The image sensor may be turned off or maty be not in the detection mode for power saving. In this instance, the voice sensor 113 may detect a noise generated by the movement, and, when the noise is detected, the voice sensor 113 operates the image sensor 111 and the image sensor 111 detects the movement and transmits the data to the processor (S12). The voice sensor 113 may transmit the detected noise to the processor 150.

If the voice sensor 113 detects noise, but no behavior is detected by the image sensor 111, a second learning step S6 proceeds. This will be described later.

The processor 150 may determine whether the movement or the noise is the stored behavior pattern based on data transmitted from the image sensor 111 or the voice sensor 113 (S2). A behavior pattern or a noise pattern may be stored in the storage unit 170. The processor 150 may determine whether the data (including the movement or the noise) transmitted from the sensor is a pattern stored in the storage unit.

When the movement transmitted from the detection sensor 110 is not a stored behavior pattern in the storage unit, the processor 150 starts a learning step S3. When the movement transmitted from the sensor is the stored behavior pattern in the storage unit, the processor starts a cleaning step S4.

With reference to FIG. 5, a first learning step (a behavior-pattern learning step) S3 will be described.

A first learning step (a behavior-pattern learning step) S3 may include a temporary storage step S31, a temporary cleaning step S33, an operation step of a foreign-material sensor S35, and a final storage step S37.

In the temporary storage step S31, the movement detected by the detection sensor is temporarily stored. The several behavior patterns may be stored as a default value in the storage unit, and the detected movement may be a behavior pattern different from behavior patterns pre-stored in the storage unit. The processor may temporarily store the detected movement in the storage unit for a verification procedure, which will be described later.

Meanwhile, the detection sensor 110 may detect a corresponding region where the detected behavior pattern occurs in a unit of a cell, and the processor 150 may temporarily store the corresponding region in a map stored in the storage unit 170.

In the temporary cleaning step S33, the mobile robot may check whether a foreign material occurs or has occurred while cleaning the corresponding area where the movement occurs or has occurred. The processor 150 may make the mobile robot clean the corresponding area where the movement occurs or has occurred. In the temporary cleaning step S33, only the corresponding area may be cleaned, or an entire area may be cleaned. When only the corresponding area is cleaned, the learning step can be quickly performed. When the entire area is cleaned, cleanliness and accuracy can be further increased.

In the temporary cleaning step S33, an operation step S35 of a foreign-material sensor is included. The foreign-material sensor 115 may operate when the corresponding area is cleaned. Alternatively, when the entire area is cleaned, the foreign-material sensor 115 may work only when the corresponding area is cleaned.

In the final storage step S37, when a foreign material is detected by the foreign-material sensor 115 during the corresponding area is cleaned, the processor 150 finally or definitely stores the temporarily-stored behavior pattern in the storage unit 170. That is, when a foreign material is detected during the cleaning of the corresponding area, the processor considers the temporarily-stored behavior pattern as a behavior pattern of causing a foreign material and finally stores the temporarily-stored behavior pattern as the behavior pattern of causing the foreign material in the storage unit. Conversely, if no foreign material is detected by the foreign-material sensor 115 in the corresponding area in the temporary cleaning step S33, the temporarily-stored behavior pattern is deleted and the learning step S3 is ended.

On the other hand, in the final storage step S37, only the temporarily-stored behavior pattern may be stored in the storage unit, or the behavior pattern and the corresponding area may be simultaneously stored. When only the behavior pattern is stored, the corresponding area where the behavior pattern occurs or has occurred is detected whenever the detection sensor 110 detects the behavior pattern. Accordingly, the processor 150 or the mobile robot may flexibly specify the corresponding area regardless of where the user acts. When the behavior pattern and the corresponding area are simultaneously stored, the processor 150 may specify the cleaning location by referring to the stored corresponding area if the corresponding region cannot be specified later.

Referring to FIG. 8, in a second embodiment, a method of learning a noise pattern will be mainly described.

When a noise is detected by a voice sensor 113 disposed in a mobile robot (S12), a processor may determine whether the detected noise is a stored noise pattern. When the detected noise is a stored noise pattern, the processor may proceed to a cleaning step S4, and thus, the mobile robot may move to the corresponding area stored with the noise pattern and may start cleaning. When the detected noise is not a stored noise pattern, the processor operates an image sensor (S11).

When the image sensor 111 operates because the detected noise is not the stored noise pattern, the processor 150 may determine whether a movement is detected by the image sensor or not.

When a movement is detected by the image sensor, the processor 150 may determine whether the detected movement is a stored behavior pattern or not. When the detected behavior is the stored behavior pattern, the processor 150 may instruct a cleaning step S4. When the detected behavior is not the stored behavior pattern, the processor 150 may proceed to an image-pattern learning step (a first learning step) S3.

When a noise is detected by the voice sensor 113, but a movement is not detected by the image sensor 111, the processor may proceeds to a second learning step (a noise-pattern learning step) S6.

When the second learning step (the noise pattern learning step) S6 starts, the mobile robot may clean an area (S61). In the above step S61, a part of the area or an entire area may be cleaned. The entire area may be an entire room in FIG. 2. The step S61 of cleaning the area may include a step S63 of detecting a foreign material by operating a foreign-material sensor.

The processor 150 may determine whether a foreign material is detected by the foreign-material sensor 115 or not (S65). If a foreign material is not detected by the foreign-material sensor 115, the second learning step S6 may be ended. When a foreign material is detected by the foreign-material sensor 115, the processor may considers the noise as a noise pattern of causing a foreign material and may store the noise as the noise pattern of causing the foreign material in the storage unit (S66). In the storage step S66, information including a noise pattern of causing a foreign material and a corresponding area in which the foreign material is detected by the foreign-material sensor may be stored.

The cleaning step will be described with reference to FIG. 6.

In the cleaning step S4, the mobile robot may move to the corresponding area where the foreign material is generated and cleans it according to an instruction of the processor. The processor 150 may determine whether the detected movement is a stored behavioral pattern or not (S2). When the detected movement is the stored behavioral pattern, the processor 150 performs the cleaning step S4. After the cleaning step S4, the correction step S5 may be performed or included.

When the cleaning step S4 is started, the processor may check whether the cleaning step S4 is an automatic cleaning mode or not (S41). Whether the automatic cleaning mode is used or not may depend on what a user previously input. If there is no input by the user, a default value may be set to clean only the corresponding area.

When the mobile robot is in the automatic cleaning mode, the processor 150 may clean the corresponding area where the stored behavior pattern occurs or has occurred in real time (S42). The processor may divide the area in which the stored behavior pattern occurs or has occurred in a unit of a cell and specify the corresponding area in real time, and then, make the mobile robot clean only the corresponding area.

[116] When the mobile robot is not in the automatic cleaning mode, the processor 150 may temporarily store the corresponding area and does not clean the corresponding area in real time. In this instance, when an entire cleaning is performed later, the corresponding area is intensively cleaned (S43). The intensive cleaning includes a turbo mode.

The automatic cleaning mode can remove the foreign material in real time and thus cleanliness can be increased. When the mobile robot is not in the automatic cleaning mode, power saving performance can be enhanced by performing an intensive cleaning later.

The processor 150 may perform a correction step S5 after the cleaning step S4.

The correction step S5 will be described with reference to FIG. 7.

In the correction step S5, the stored behavior pattern is corrected. The correction step S5 may include deleting of the stored behavior pattern when the stored behavior pattern no longer cause or generates a foreign material or was incorrectly stored even if the stored behavior pattern does not cause or generate a foreign material.

The processor 150 may operate the foreign-material sensor 115 during the cleaning step S4 and determine whether the foreign material is detected by the foreign-material sensor in the corresponding area or not (S51). When the foreign material is detected by the foreign-material sensor 115, the correction step is ended to maintain the stored behavior pattern. When the foreign material is not detected by the foreign-material sensor 115, it is determined that the stored behavior is not an behavior pattern of causing the foreign material and the stored behavior pattern is deleted and the correction step is ended (S53).

According to the present disclosure, the mobile robot can perform learning to be more suitable for a living pattern by receiving feedback through adding the correction step S5 to the control method of the mobile robot. Accordingly, the mobile robot according to the present disclosure can provide a customized service to a user.

Referring to FIG. 9 and FIG. 10, the mobile robot 100 being able to further improve a learning ability or a cleaning ability in association with other devices will be described.

For example, as shown in FIG. 9, a movement may occur in a space outside an area (room A) detected by an image sensor of a mobile robot. When there is a movement in a living room B, an image sensor 111 of the mobile robot cannot detect the movement, and thus, a voice sensor 113 may be operated by detecting only noise. Therefore, a corresponding area where the foreign material occurs or has occurred may not be quickly identified.

In this case, in association with a detection sensor of other device, for example, an air conditioner on a left side of a subject in FIG. 9, the movement detected by the detection sensor of the other device is transmitted to the mobile robot to perform a learning step S3 or a cleaning step S4.

Referring to FIG. 10, the mobile robot 100 may form a network with other devices through a server. The devices may include various devices having detection sensors, such as, an air conditioner, a closed circuit television (CCTV), and other mobile robot, or so on.

The mobile robot may detect a movement, perform learning of a behavior pattern, or specifying a corresponding area in which a foreign material occurs or has occurred in association with detection sensors of other devices.

The processor may receive data (including a movement) detected by a detection sensor of another device. When the data is a pre-stored behavior pattern, the processor may control the mobile robot to clean the corresponding area.

The processor may transmit data including a movement detected by the sensor to the server. Other devices that have received the data may provide a customized service. For example, when the foreign material is liquid, a wet cleaning method of wiping with a rag or a mop is useful. Thus, when a mobile robot A with a dry cleaning unit detects the corresponding behavior pattern, the mobile robot A may transmit data to a mobile robot B with a wet cleaning unit, and the mobile robot B may clean the corresponding area where a foreign material of liquid occurs or has occurred.

In addition, a detection sensor may be separately provided in the mobile robot 100 and the charging base 200. Accordingly, the mobile robot 100 when the cleaning is performed may detect a movement and clean the corresponding area where the foreign material occurs or has been occurred in real time. When the sensor of the charging base 200 detects a movement during the mobile robot cleans, the charging base 200 may transmit data to the mobile robot 100 to clean the corresponding area where the foreign material occurs or has occurred.

Although the preferred embodiments of the present disclosure have been illustrated and described above, the present disclosure is not limited to the specific embodiments described above. Also, various modifications can be made by those skilled in the art where the present disclosure belongs without departing from technical features of the present disclosure claimed in the claims, and these modifications should not be individually understood from the technical spirit or prospect of the present disclosure.

The invention claimed is:

1. A control method of a mobile robot, comprising:
a detection step of detecting a movement occurring in an area to be cleaned;
a determination step of determining whether the detected movement is a stored behavior pattern or not; and
a first learning step of learning whether the detected movement is a behavior pattern of causing a foreign material or not when it is determined that the detected movement is not the stored behavior pattern, and
wherein the first learning step comprises:
a temporary storage step of temporarily storing the detected movement;
a temporary cleaning step of cleaning a corresponding area where the movement that is temporarily stored occurs;
an operation step of a foreign-material sensor in the temporary cleaning step; and
a final storage step of storing the movement that is temporarily stored as a behavior pattern of causing a foreign material when a predetermined foreign material is detected by the foreign-material sensor.

2. The control method of claim 1, wherein, in the final storage step, the corresponding area where the movement occurs is further stored.

3. The control method of claim 1, further comprising:
transmitting data on the detected movement to a server.

4. The control method of claim 1, wherein the detection step comprises:
determining whether an image sensor is in a detection mode or not;
starting a noise detection mode by operating a voice sensor when the image sensor is not in the detection mode; and
detecting a movement by operating an image sensor when the voice sensor detects a noise.

5. The control method of claim 4, further comprising:
a second learning step of learning whether the detected noise is a noise pattern of causing a foreign material or not when the movement is not detected by the image sensor,
wherein the second learning step comprises:
cleaning an area;
detecting a foreign material by operating a foreign-material sensor; and
determining whether the foreign material is detected or not by the foreign-material sensor or not.

6. The control method of claim 5, wherein the second learning step further comprises:
storing the detected noise as the noise pattern of causing the foreign material when the foreign material is detected by the foreign-material sensor.

7. The control method of claim 1, further comprising:
a cleaning step of performing a cleaning operation when the detected movement is the stored behavior pattern.

8. The control method of claim 7, wherein the cleaning step comprises:
cleaning the corresponding area where the detected movement occurs in the detection step when a user sets an automatic cleaning mode, and intensively cleaning the corresponding area while cleaning an entire area when the user does not set the automatic cleaning mode.

9. The control method of claim 7, wherein the cleaning step comprises:
a correction step of deleting the stored behavior pattern when a foreign material is not detected in the cleaning step.

10. The control method of claim 9, wherein the correction step comprises:
operating a foreign-material sensor in the cleaning step in the corresponding area where the detected movement occurs; and
deleting the stored behavior pattern when a foreign material is not detected in the corresponding area by the foreign-material sensor.

11. A mobile robot, comprising:

a detection sensor of detecting a movement of a living body existing in an area to be cleaned;

a processor of learning whether the detected movement is a behavior pattern of causing a foreign material or not;

a cleaning unit for cleaning the foreign material; and a foreign-material sensor of detecting the foreign material existing in the area to be cleaned, wherein the processor learns whether the detected movement is the behavior pattern of causing the foreign material or not when the detected movement is not a stored behavior pattern, and wherein learning by the processor comprises:

temporarily storing the detected movement;

temporary cleaning a corresponding area where the movement that is temporarily stored occurs;

operating the foreign-material sensor in the temporary cleaning; and storing the movement that is temporarily stored as a behavior pattern of causing a foreign material when a predetermined foreign material is detected by the foreign-material sensor.

12. The mobile robot of claim 11, wherein the detection sensor comprises:

an image sensor of detecting the movement of the living body existing in the area to be cleaned; and a voice sensor of detecting a noise and operating the image sensor.

13. The mobile robot of claim 12, wherein the processor makes the mobile robot clean an area stored together with a stored noise pattern when the stored noise pattern is detected by the voice sensor, and wherein the processor operates the image sensor when a noise that is not stored is detected by the voice sensor.

14. The mobile robot of claim 12, wherein the processor deletes the stored behavior pattern when a foreign material is not detected by the foreign-material sensor in the corresponding area during cleaning.

* * * * *